(12) United States Patent
Bignotto et al.

(10) Patent No.: US 8,602,695 B2
(45) Date of Patent: Dec. 10, 2013

(54) CARTRIDGE WITH FINE-ADJUSTMENT POSITIONING CLICK USED ON A BORING BAR

(75) Inventors: Djalma Augusto Bignotto, Santa Barbara d'Oeste (BR); Elio Andia, Santa Barbara d'Oeste (BR); Luis Carlos Bachin, Santa Barbara d'Oeste (BR); Paulo Cesar Oliveira, Santa Barbara d'Oeste (BR)

(73) Assignee: Kennametal Inc., Latrobe, PA (US)

( * ) Notice: Subject to any disclaimer, the term of this patent is extended or adjusted under 35 U.S.C. 154(b) by 344 days.

(21) Appl. No.: 13/093,208

(22) Filed: Apr. 25, 2011

(65) Prior Publication Data

US 2011/0262236 A1      Oct. 27, 2011

(30) Foreign Application Priority Data

Apr. 27, 2010 (BR) ...................................... 1001101

(51) Int. Cl.
*B23B 29/034*          (2006.01)

(52) U.S. Cl.
USPC .......................................... 408/181; 408/153

(58) Field of Classification Search
CPC .................................................... B23B 29/034
USPC ........ 408/181, 182, 185, 153; 407/87, 92, 96, 407/37
See application file for complete search history.

(56) References Cited

U.S. PATENT DOCUMENTS

| | | | | |
|---|---|---|---|---|
| 3,434,376 A | * | 3/1969 | Benjamin et al. | 408/153 |
| 3,911,542 A | * | 10/1975 | Friedline et al. | 407/76 |
| 4,878,787 A | * | 11/1989 | Hunt | 408/181 |
| 5,257,881 A | * | 11/1993 | Scheer | 408/153 |
| 5,454,667 A | * | 10/1995 | Cirino et al. | 408/181 |

(Continued)

FOREIGN PATENT DOCUMENTS

| BR | 9403646-2 A | 9/1996 |
|---|---|---|
| BR | 0309477 A | 5/2005 |

(Continued)

OTHER PUBLICATIONS

Li Ronggui, "Micro-Feeding Tool Holder based on Threaded Differential," Modern Manufacturing Engineering, Dec. 31, 1983, p. 14, vol. 12.

(Continued)

*Primary Examiner* — Daniel Howell
*Assistant Examiner* — Ryan Rufo
(74) *Attorney, Agent, or Firm* — Larry R. Meenan, Esq.

(57) ABSTRACT

A cartridge assembly for use on a boring bar includes: a main body having an internal thread disposed about an axis; a tubular shaft movable with respect to the main body along the axis, the shaft having an internal thread and a portion structured to receive a cutting mechanism; a torque-receiving assembly having a first and second threaded parts, the first threaded part cooperatively engaging the internal thread of the shaft, the second threaded part cooperatively engaging the internal thread of the main body; and an entrainment cover coupled to the torque-receiving assembly and rotatable with respect to the main body about the axis. The entrainment cover interacts with the main body in a manner that produces an indicating click upon rotation thereof, each click being indicative of a distance the shaft is displaced in regard to the main body as a result of the rotation of the entrainment cover.

7 Claims, 4 Drawing Sheets

(56) References Cited

U.S. PATENT DOCUMENTS

2005/0268759 A1    12/2005  Cardemon et al.
2006/0239787 A1*   10/2006  Stadelmann et al. ......... 408/124
2007/0084320 A1*   4/2007   Frank et al. .................... 82/158

FOREIGN PATENT DOCUMENTS

| CN | 1080886 A    | 1/1994  |
|----|--------------|---------|
| CN | 1665626 A    | 9/2005  |
| WO | 03090957 A2  | 11/2003 |

OTHER PUBLICATIONS

Luo Kuiyuan, et al., "Design and Manufacture of Fine-adjustable Boring Tool Based on Threaded Differential," Tool Technologies, Oct. 31, 2003, p. 45-46, vol. 10/37.

* cited by examiner

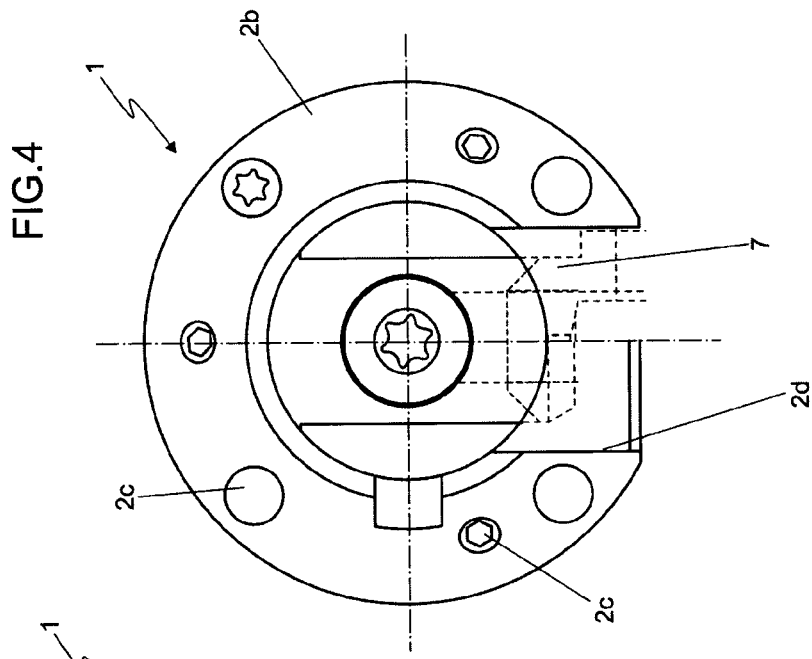
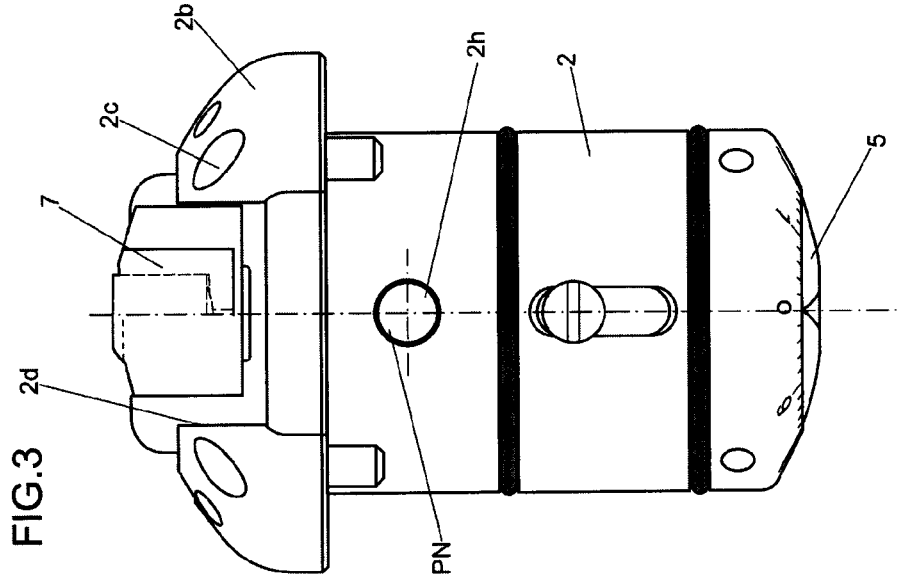

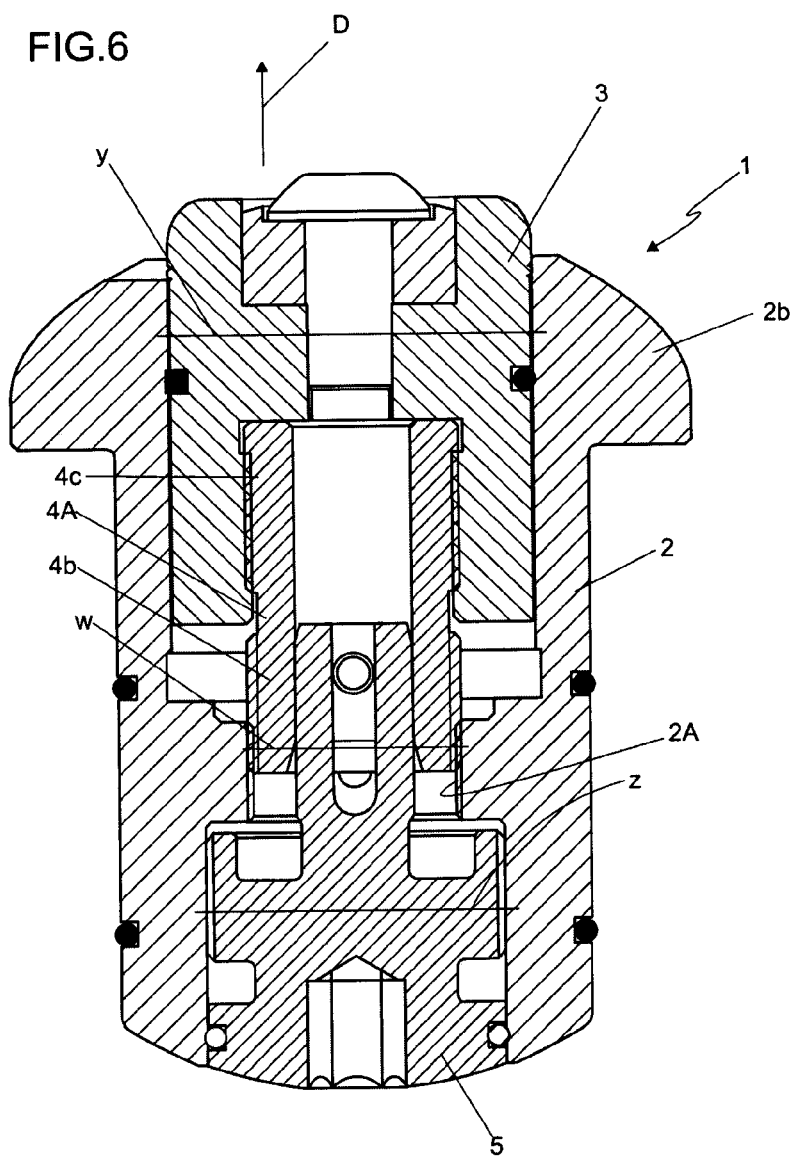

CARTRIDGE WITH FINE-ADJUSTMENT POSITIONING CLICK USED ON A BORING BAR

FIELD OF THE INVENTION

The present invention relates to improvements made to a cartridge with fine-adjustment positioning click used on a boring bar, for general machining. The invention was developed for the precise adjustment of the dimensional aspects of measurements with tolerances down to a thousandth of a part, allowing control of the quality of the workpieces being produced and in addition guaranteeing the stability of the manufacturing process in various sectors of industry such as the automobile, petroleum, aerospace, weapons-manufacturing, agricultural-machinery and industrial-machinery sectors, inter alia.

BACKGROUND INFORMATION

As is generally known, boring is a mechanical process for machining surfaces of revolution carried out by one or more cutting tools. Boring machines used for performing such operations typically allow the fitting of various types of tools to permit the performance of other operations, such as drilling, milling, thread-cutting, etc.

Depending on the position of the shaft/arbor, such boring machines may be horizontal or vertical, and boring may be cylindrical, conical, radial or spherical, enabling internal conical or cylindrical surfaces to be obtained in spaces that are normally difficult to access. Such boring may utilize axes that are perfectly parallel to one another, by means of the positioning of the machining tool by means of adjustment of the headstock to a specific height and the platen in a transverse position, all the displacements being indicated on graduated scales by means of optical reading equipment or analog/digital counters.

Therefore, for such boring operations, use is made of boring tools selected as a function of the dimensions and characteristics of the operation (i.e., length and diameter). The tools commonly have small dimensions since they operate inside bores previously made by boring bits, such as the boring bar, which, in turn, has to be rigid, cylindrical and with no rectilinearity defect, affording correct positioning on the shaft/arbor for the mounting of bushes that form bearings, thereby preventing possible deflections and vibrations.

Such boring bars incorporate interchangeable tips and micrometric adjustment systems for increasing the depth of the tool in the workpiece, thus permitting better finishing and cylindricity conditions. Such adjustment systems may include adjustment cartridges that allow precise boring within tolerance requirements.

However, conventional adjustment cartridges do not afford sufficient precision and allow coarse adjustment (i.e., the resolution of the apparatus allows increments of 0.010 mm in terms of the radius).

A further drawback lies in the fact that conventional cartridges require auxiliary equipment for making the adjustment of the measurement, thereby increasing the adjustment time.

Yet another drawback lies in the fact that conventional cartridges have a locking screw, enabling the apparatus to be unusable on account of damage caused to the adjustment mechanism during performance of the operation when carried out by an untrained technician.

EXAMINATION OF THE PRIOR ART

A brief search of the patent literature revealed a few documents relating to a dimensional adjustment mechanism for a spindle, such as document No PI0309477-4, which relates to a slidable boring tool with fine adjustment, a boring tool, in one embodiment, including a coupling element actuated by a CNC boring machine, a cutting tool that is coupled slidably to the coupling element and a slidable adjustment element. A friction force resists the sliding movement of the cutting tool. The friction force is sufficient to maintain the position of the cutting tool during work operations on the machine. However, the friction force is insufficient to resist an adjustment force applied by the adjustment element. The sliding movement of the adjustment element, by pulling or pushing thereof, results in the movement of the cutting tool. In one embodiment, the cutting tool and the adjustment element slide in different directions. In a further embodiment, the boring tool is adapted and configured to convert a greater first degree of movement by the adjustment element into a smaller second degree of movement by the cutting tool.

Another document, No PI9403646-2, relates to a drilling headstock with micrometric adjustment and full capacity for variation of diameters. The document describes: a stepped cylindrical body provided with an end of smaller diameter for seating in a suitable support on a lathe; an intermediate section that accommodates a device for micrometric adjustment of the radial path of the headstock and opposing end extension in the form of channelling which, in collaboration with a channelled cover, defines a radial guide for a carriage secured to the micrometric adjustment device and which supports an interchangeable boring bar that carries a machining cutting edge.

Both documents found present a complex configuration, which gives rise to an increase in the cost of the product and makes purchase thereof less viable.

SUMMARY OF THE INVENTION

Intending to provide improvements for the consumer market, the applicant developed an improved cartridge with fine-adjustment positioning click used on a boring bar, for general machining. The invention provides for the precise adjustment of the dimensional aspects of measurements with tolerances down to a thousandth of a part, allowing control of the quality of the workpieces being produced and additionally guaranteeing the stability of the manufacturing process for various sectors of industry, such as the automobile, petroleum, aerospace, weapons-manufacturing, agricultural-machinery and industrial-machinery sectors, inter alia.

The now improved cartridge is configured by a set of parts that can be coupled to one another and that are coaxial, formed by a tubular main body provided with an internal thread with differential pitch upon which are mounted a likewise tubular movable shaft and a threaded part of the torque-receiving assembly which, in turn, incorporates an entrainment cover provided with an indicating click, which is configured by the popping of individual spheres generated by the friction of diametrical milling provided on the entrainment cover.

The movable shaft receives a conventional cutting mechanism and also has an internal thread for the mounting of the threaded part of the torque-receiving assembly. Each turn of the entrainment cover generates the popping of the positioning click which, in turn, is reciprocated by the displacement of the movable shaft and consequently the cutting mechanism (i.e., the displacement is configured by the thread pitch differential between the main body and threaded part, defining a micro-resolution for small and precise adjustment increments).

OBJECTIVES AND ADVANTAGES

The main objective achieved with the dimensional adjustment of measurements with tolerances down to a thousandth of a part for machining, thereby reducing waste and also by obviating any type of mistake on the part of the operator.

A further advantage lies in the fact that the indicating click permits adjustment by unskilled operators, lending speed and practicality to the adjustment of the mechanism.

A further advantage lies in the fact that the simplified configuration of the cartridge results in a low cost and ease of maintenance.

A further advantage lies in the fact that the adjustment is implemented directly on the machine, dispensing with the use of saddle-type comparison instruments.

BRIEF DESCRIPTION OF THE DRAWINGS

To supplement the present description, so as to obtain a better understanding of the features of the present invention, and in accordance with a preferred practical embodiment thereof, the description is accompanied by a set of attached drawings in which, in an illustrative but non-limiting manner, the following has been shown:

FIGS. 3 and 4 show lateral and top views of the cartridge of FIG. 1; and

FIGS. 5 and 6 show longitudinal sectional views of the cartridge of FIG. 1 indicated in the above figures, with the respective detail.

DESCRIPTION OF THE PREFERRED EMBODIMENTS

Figure 2:
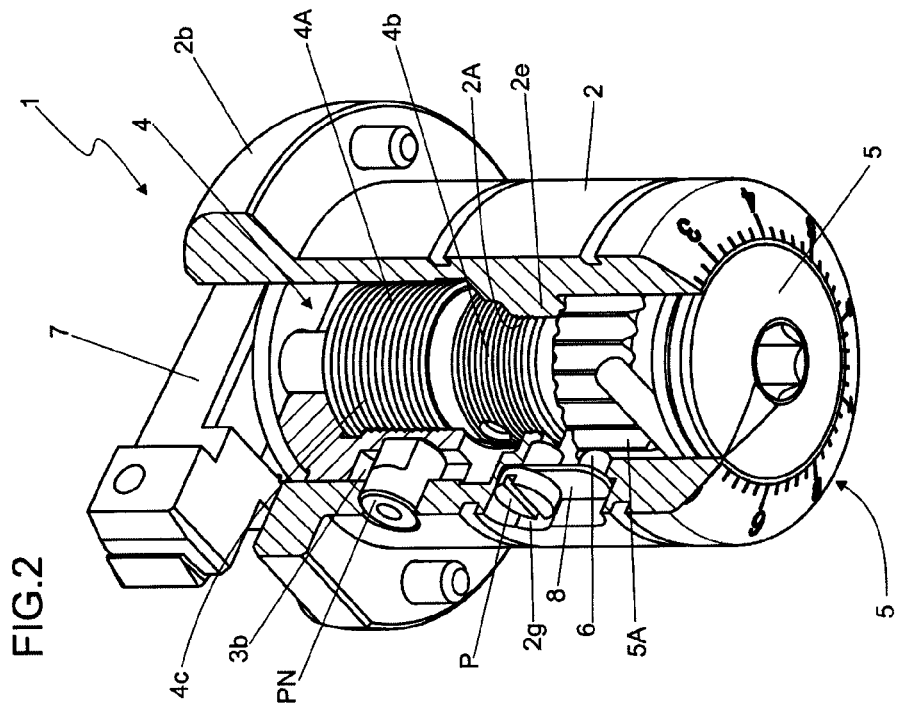
FIG. 2 shows a perspective view of the cartridge of FIG. 1, with partial cutaway, illustrating elements that make up the cartridge.
Figure 1:
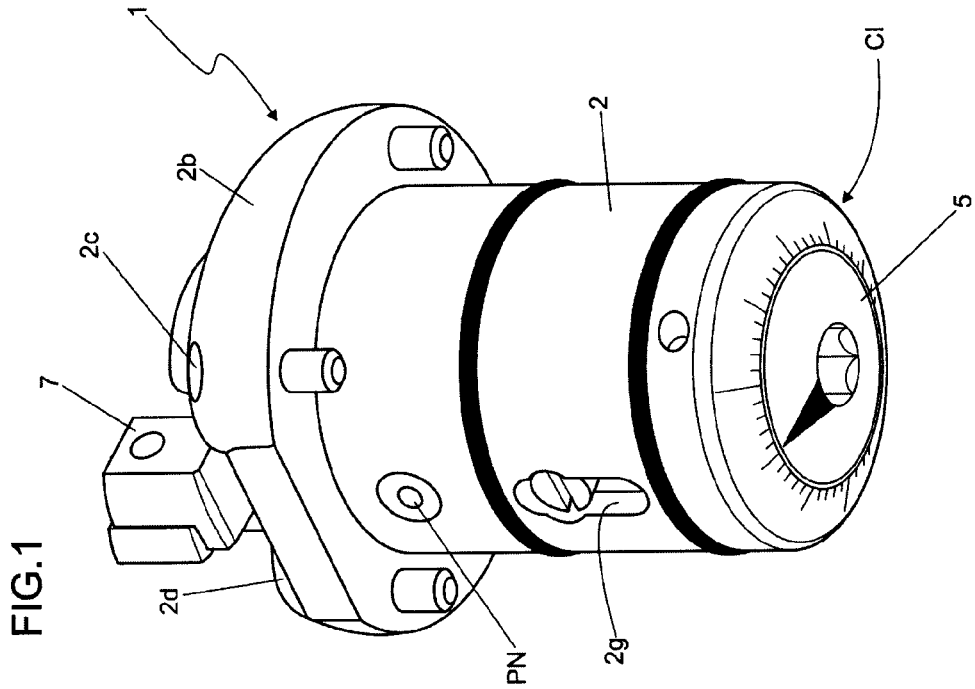
FIG. 1 illustrates a perspective, assembled view of an improved cartridge.

With reference to the figures, the present invention relates to improvements made to a cartridge having a fine-adjustment positioning click used on a boring bar. More specifically, a cartridge 1 with fine-adjustment AJ indicating click CI used on a boring bar (not shown), for general machining, allows for the precise adjustment of the dimensional aspects of measurements with tolerances down to a thousandth of a part, providing control of quality of the workpieces being produced and in addition guaranteeing the stability of the manufacturing process in various sectors of industry, such as the automobile, petroleum, aerospace, weapons-manufacturing, agricultural-machinery and industrial-machinery sectors, inter alia.

According to an embodiment of the present invention, the cartridge 1 is configured by a set of parts that can be coupled to one another and that are coaxial, formed by a tubular main body 2 provided with an internal thread 2A with differential pitch upon which are mounted a likewise tubular movable shaft 3 and a threaded part 4A of the torque-receiving assembly 4 which, in turn, incorporates an entrainment cover 5 provided with the indicating click CI, which is configured by the popping of individual spheres 6 generated by the friction of diametrical milling 5A provided on said entrainment cover 5. The movable shaft 3 receives the conventional cutting mechanism 7 and also has an internal thread 3A (FIG. 5) for mounting of the threaded part 4A of the torque-receiving assembly 4, each turn of the entrainment cover 5 generates the popping of the indicating click CI which, in turn, is reciprocated by the displacement of the movable shaft 3 and consequently the cutting mechanism 7 (i.e., said displacement D is configured by the difference in thread pitch defining a micro-resolution for small and precise adjustment increments).

In a preferred structural version, the tubular main body 2 is provided with a flange 2b, the upper face of which is dished and includes multiple orifices 2c and a central cut 2d made for the coupling of the cutting mechanism 7. The tubular portion of the body 2 is configured by three mutually distinct portions, the diameters y, z and w (FIG. 6) of which are different, forming an inner ring 2e where the thread 2A with differential pitch PD is provided for the mounting of the threaded free end 4b of the part 4A, receiving the movable shaft 3 in the more elongate portion of diameter y, whilst the portion of smaller diameter z receives the entrainment cover 5.

Figure 5:
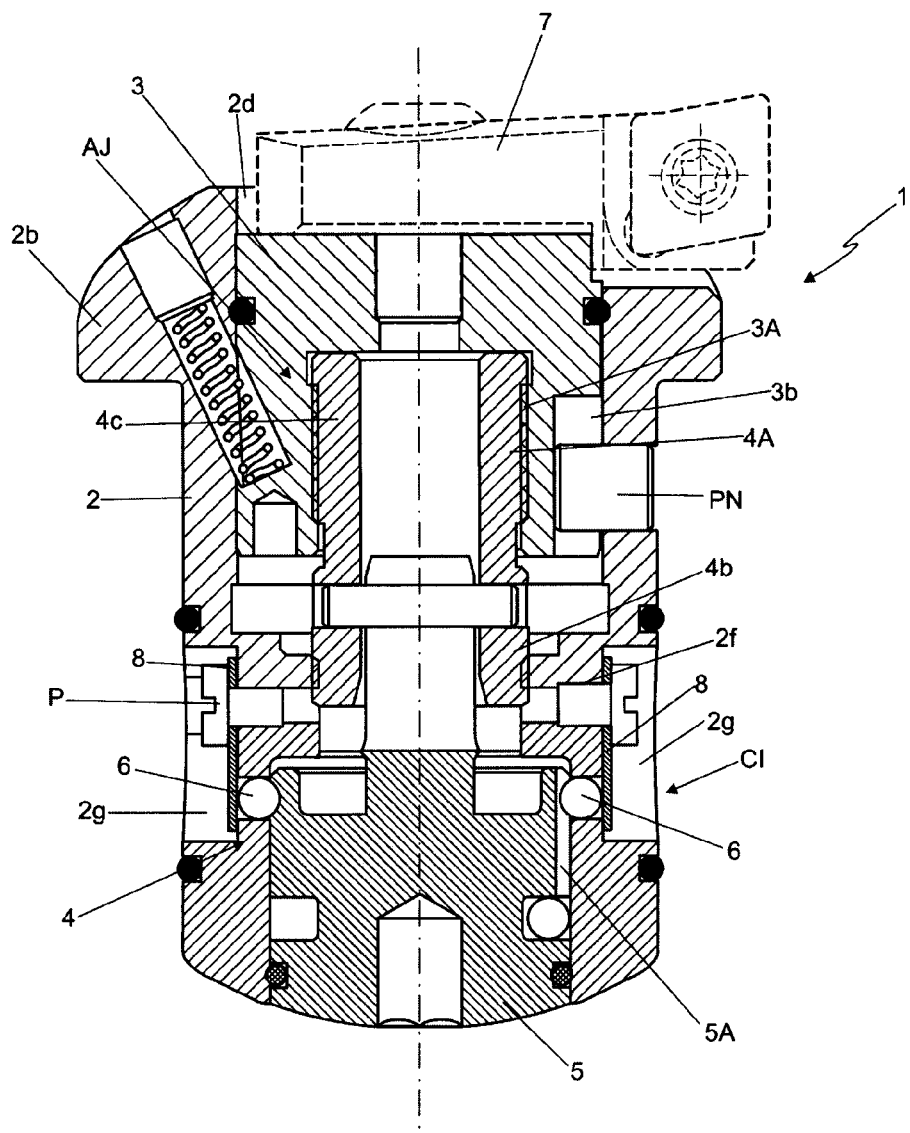

Referring to FIGS. 2 and 5, the portion having diameter z incorporates orifices 2f, for the mounting of the spheres 6, which are aligned with oblong slots 2g where flat-type springs 8, fastened by screws P, are mounted, whilst, close to the flange 2b, a further orifice 2h (FIG. 3) is made for the mounting of a locating bolt PN that in turn is mounted in a recess 3b (FIG. 2) of the movable shaft 3.

The movable shaft 3 has an "H" cross section and incorporates an internal thread 3A for the mounting of the other threaded free end 4c of the part 4A of the torque-receiving assembly 4, the entrainment cover 5 of which, by means of turning, displaces the movable shaft 3 (i.e., when the differential thread is actuated, the movable shaft 3 is displaced by a small increment deriving from the difference between the thread pitches).

Therefore, a thread pitch of 0.xx mm "forward" and of 0.x mm "rearward" means that the movable shaft 3 and the cutting mechanism 7 are displaced by 0.0x mm, and thus, by means of the use of the indicating click CI, it is possible to obtain a radical result of 0.00x mm.

For example, a pitch of 0.55 mm "forward" and of 0.50 mm "rearward" means that the movable shaft 3 and the cutting mechanism 7 will be displaced by 0.05 mm (divided by the number of diametrical millings on the entrainment cover, preferably 50), and thus, by means of the use of the indicating click CI, it is possible to obtain a radial result of 0.001 mm (i.e., 0.05 mm divided by 50 clicks=0.001 mm/click).

Admittedly, when the present invention is put into practice, it will be possible to introduce modifications in terms of certain details of structure and form, without that implying a departure from the basic principles that are clearly substantiated within the context of the claims, it being understood that the terminology used is not intended to be limiting.

What is claimed is:

1. A cartridge assembly with fine-adjustment positioning click for use on a boring bar, the cartridge assembly comprising:

a tubular main body disposed about a longitudinal axis, the main body having an internal thread;

a tubular movable shaft engaging the main body such that the movable shaft is movable with respect to the main body along the longitudinal axis, the movable shaft having an internal thread and a portion structured to receive a cutting mechanism;

a torque-receiving assembly having a first threaded part and a second threaded part, the first threaded part cooperatively engaging the internal thread of the movable shaft, the second threaded part cooperatively engaging the internal thread of the main body; and an entrainment cover slidably coupled to the torque-receiving assembly such that the torque receiving assembly is moveable with respect to the entrainment cover along the longitudinal axis, the entrainment cover being rotatable, while not translatable, with respect to the tubular main body about the longitudinal axis, wherein upon rotation of the entrainment cover about the longitudinal axis, a portion of the entrainment cover interacts with a portion of the main body in a manner that produces an indicating click, each click being indicative of a distance the movable shaft is displaced in regard to the main body as a result of the rotation of the entrainment cover.

2. The cartridge assembly of claim 1 wherein the portion of the entrainment cover comprises a plurality of diametrical millings and the portion of the main body comprises a sphere housed in the main body and biased toward the longitudinal axis.

3. The cartridge assembly of claim 1 wherein the main body is provided with a flange having an upper face, the upper face of which is rounded and includes multiple orifices and a central portion structured to permit a portion of the cutting mechanism to be coupled to the moveable shaft.

4. The cartridge assembly of claim 3 wherein the main body comprises three mutually distinct inner portions, each inner portion having a diameter that is different from each of the other portions.

5. The cartridge assembly of claim 4 wherein the three mutually distinct inner portions comprise:
   a first portion where the internal thread with differential pitch is provided;
   a second portion engaged by the movable shaft; and
   a third portion disposed about the entrainment cover.

6. The cartridge assembly of claim 5 wherein:
the entrainment cover comprises a plurality of diametrical millings; and
the third portion comprises:
   a number of orifices, each orifice having a sphere movably disposed therein;
   a number of oblong slots, each slot aligned with a respective orifice of the number of orifices; and
   a number of flat-type springs, each spring disposed in, and coupled to, a respective oblong slot of the number of oblong slots,
wherein each flat type spring biases a respective sphere toward the diametrical milling of the entrainment cover.

7. The cartridge assembly of claim 1 wherein the distance the moveable shaft is displaced is a function of the difference between the thread pitch of the internal thread of the main body and the internal thread of the movable shaft.

* * * * *